Aug. 31, 1965 C W. MUSSER 3,203,141
INSISTOR
Filed March 15, 1961 3 Sheets-Sheet 1
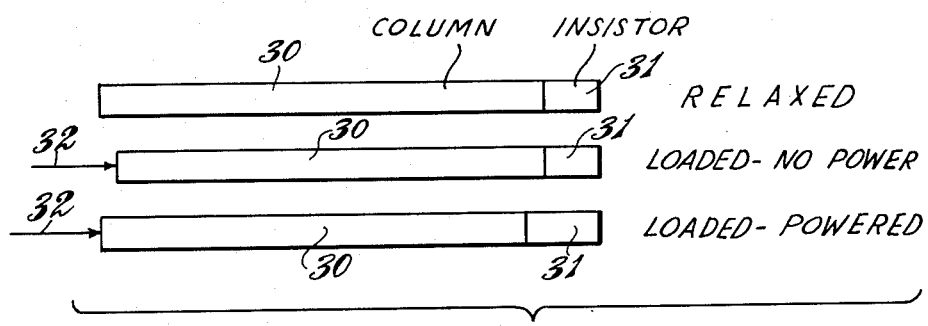
Fig. 10.
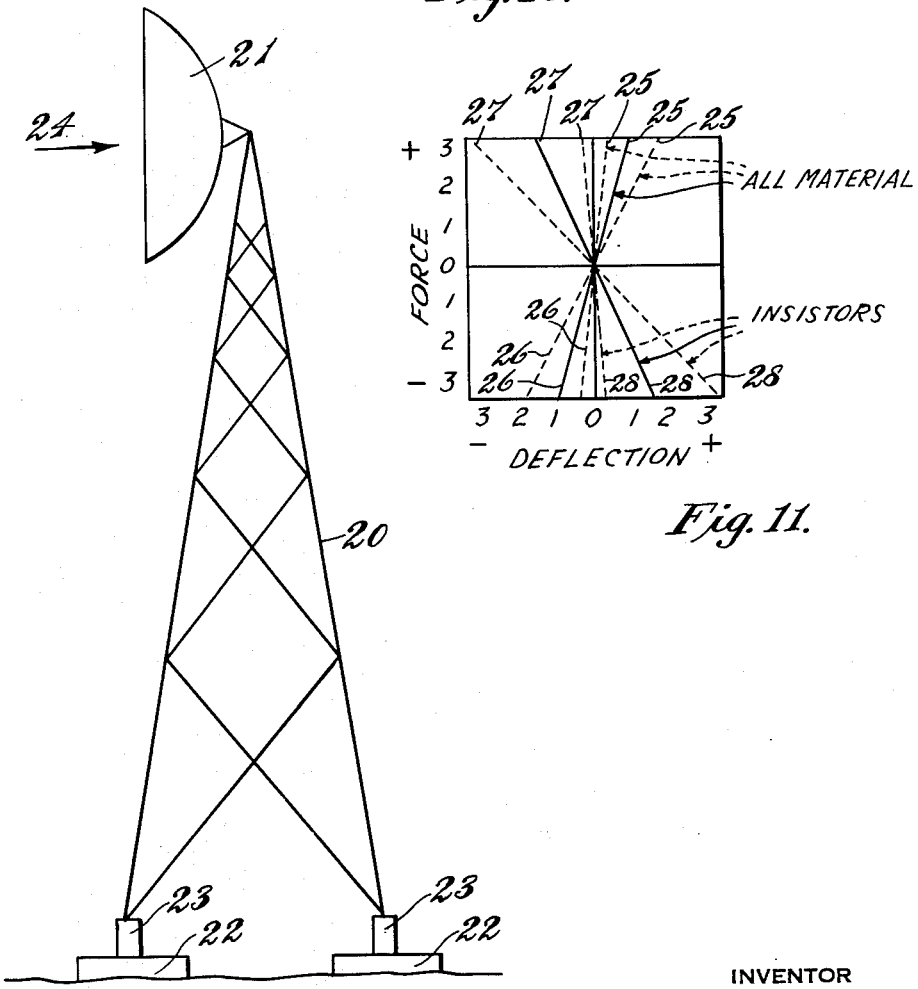
Fig. 11.
Fig. 1.
INVENTOR
C WALTON MUSSER
BY
ATTORNEYS Aug. 31, 1965  C W. MUSSER  3,203,141
INSISTOR
Filed March 15, 1961  3 Sheets-Sheet 2

INVENTOR
C WALTON MUSSER
BY
ATTORNEYS

INVENTOR
C WALTON MUSSER
BY
ATTORNEYS

United States Patent Office 3,203,141
Patented Aug. 31, 1965

3,203,141
INSISTOR
C Walton Musser, 928 Via Panorama,
Palos Verdes Estates, Calif.
Filed Mar. 15, 1961, Ser. No. 95,909
14 Claims. (Cl. 52—1)

The present invention relates to devices for use with structure requiring correction for change in position and which devices for the purpose of convenience are referred to herein as insistors.

A purpose of the present invention is to provide a device which is adapted for use with a movable structural member and which is adapted to respond to force and position of the structural member and induce corrective motion counter to the force to restore substantially the position in space of a point on the structural member while the structural member is under strain.

A further purpose is to render a structural member effectively inelastic at a first point thereon under strain with reference to a second point on the member by sensing under the force of the member the position of the second point and the strain induced in the member by the force, and effecting corrective motion of the member actively opposing the force for a distance varying as a direct function of the strain and the distance of movement of the second point induced by the force, thus substantially restoring position in space of the first point while the force endures.

A further purpose is to provide a load and position responsive device which is adapted to induce motion counter to force of a structural member, concurrently while the member has first and second points both altered in position in space by the force and while strain of the force alters the position of the first point with reference to the position of the second point, and which device moreover by the motion induced counter to the force substantially restores the position in space of the first point.

A further purpose is the provision of a device of the character indicated, in which an actuator element is adapted to be connected with a movable structural member and to move in response to force with the movable structural member, and in which a driven element is adapted to be driven and move the actuator element against the force of the actuator element, the motion of the driven element being substantially equal to the amount of motion of said actuator element produced by force on the actuator element plus strain in the movable structural member.

A further purpose is to connect a structure to a driven element, to provide a grounded anchorage element which is effectively fixed, to interpose an actuator element in operative relation between the grounded anchorage element and the driven element, and to control the motion of the driven element by a control element which in effect measures motion per unit of force of the actuator element.

A further purpose is to make the control element respond to the relative positions of the actuator element, the driven element and the fixed element among one one another.

A further purpose is to vary the gradient.

A further purpose is to provide resilient lost motion between the actuator element and driven element.

Further purposes appear in the specification and in the claims.

In the drawings I have chosen to illustrate a few only of the numerous embodiments in which my invention may appear, selecting the forms shown from the standpoints of convenience in illustration, satisfactory operation and clear demonstration of the principles involved.

FIGURE 1 is a diagrammatic side elevation of a structure embodying the principles of the invention, specifically a radar microwave tower useful in explaining the invention.

FIGURE 10 is a series of diagrams useful in explaining the invention.

FIGURE 11 is a group of stress-strain diagrams, plotting force as the ordinate and deflection as the abscissa, which help in understanding the invention.

Figure 2:
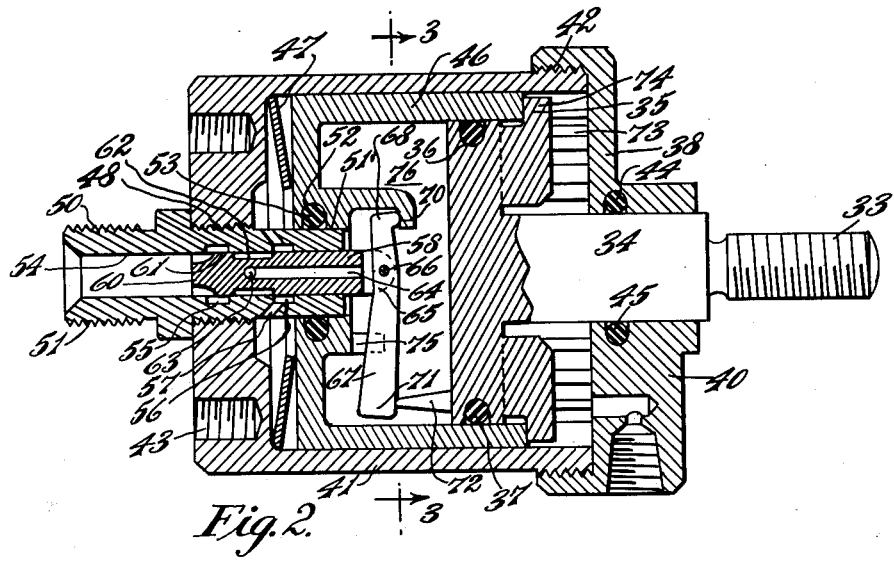
FIGURE 2 is a diagrammatic axial section of a hydraulic embodiment of an insistor according to the invention.
Figure 9:
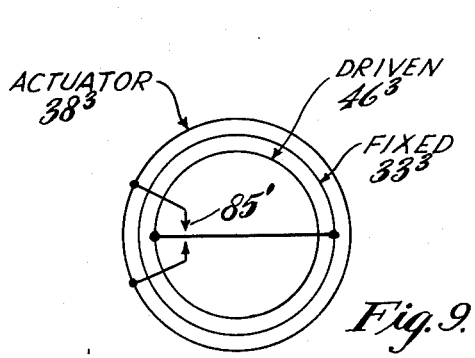
FIGURE 9 is a diagram corresponding to a transverse section through the control element of FIGURE 8 showing the operation diagrammatically.

Describing in illustration but not in limitation and referring to the drawings:

As well known, all structural elements made from any suitable material, whether it be metal, concrete, plastic or otherwise, have a deflection or strain in the direction of the force or stress which is applied. This movement in the direction of the applied force has been arbitrarily given a positive value throughout the years, and therefore the device of the invention, which I call an insistor, which moves in the direction opposite to the force, has a negative value. Thus, as a simple example, when a force is applied to a spring, the spring deflects, and during the act of deflecting, the motion of the spring at the end to which the force is applied is in the direction of the applied force. For most materials, when working in the elastic range, the amount of the deflection depends on the amount of force and the spring gradient or rate in pounds change per inch of motion. When one expresses the force in relation to unit area and deflection in terms of unit length, the resultant ratio is usually referred to as the modulus of elasticity, whether it be in tension, compression, torsion or otherwise, and this modulus is always considered to have a positive value.

In contrast to this known practice, an insistor according to the invention always has a deflection in the opposite direction from the force. Therefore, when a force is applied to an insistor in such a direction as to compress it, the insistor increases in length. When a force is applied to an insistor in such a direction as to elongate it, is reduces in length. When a force is applied in such a way as to twist it in one direction, it twists in the opposite direction.

Just like a material, an insistor has a rate, gradient or modulus, but, in relation to accepted practice, the value is negative.

Thus, if a piece of any construction material with a given positive modulus or gradient is placed in series with an insistor having the same numerical gradient but of negative value, the resultant structure will have an infinite gradient. Thus, any amount of force applied within the strength capabilities of such structure will not cause any deflection. By designing a structure so that insistors are present and are properly placed, changes in load or force applied to such a structure will not cause deflection of this structure.

Simply as a convenient example, I illustrate in FIGURE 1 a microwave tower 20 supporting a microwave dish 21. The tower is mounted on legs or footings 22 each of which is suitably a concrete foundation, which legs each support an insistor 23 on which the tower proper is mounted. It will be understood that the insistors 23 are interposed between the ironwork of the tower and the concrete legs or footings 22 so that the insistors not only support the tower from the footings in compression but also tie the tower to the footings in tension.

When the insistors are inactive, it is obvious that a wind load indicated by the arrow 24 applied in any direction to the microwave dish will cause deflection of the tower. This deflection is in the form of tensional stretching on one side of the tower 20, compressional shrinking or shortening on the other side of the tower 20, movement of the footings 22 in the earth, and deflection of the concrete in the footings 22. Thus, if we assume that a load of 100 pounds is applied to the top of the tower and moves the top of the tower 1 inch, the tower will have a gradient of 100 pounds per inch. Unfortunately this deflection causes the dish 21 to change its direction and hence partially defeats the purpose of the tower in maintaining a precise aiming position of the dish. However, if power is applied to the insistors 23 and they are adjusted so that their gradient is numerically equal to and exactly opposite to that of the tower, the top of the tower will remain motionless under the applied wind load, since the insistors will completely compensate for it. By proper placement and adjustment the insistors cancel out any unwanted deflection.

There are many structures in which rigidity is a paramount consideration. They have to be heavily built to provide a sufficient cross section to assure minimal deflection. Often, however, in such structures the very weight necessary in the heavy cross section is highly detrimental if moving parts are involved. An example of this is a telescope which has to have large masses swinging through large arcs. Since all materials deflect, the best prior practice has been to design the structure so that the deflection would be a minimum. Where, however, performance depends on accuracy of position measured by light beams or radio waves, the deflections encountered in such large structures are almost prohibitive. Changing of constructional material does not solve the problem since all materials have a gradient or modulus of elasticity. Also for structural materials the gradient is related to weight, the lighter the weight the greater the deflection under a given load. Therefore in the case of a moving structure, change in material is of little value where the deflection is in fact a result of the weight.

This will be better understood by considering a particular example, let us say, a tall tower as in FIGURE 1. Let us assume that the radar microwave dish 21 is 20 feet in diameter mounted on tower 20 which is 200 feet high and has a base 20 feet square. In order to simplify the calculation, let us assume that the tower and dish are weightless. The deflections calculated will be those from the applied wind load alone. Assuming a wind force of 30 pounds per square foot, the force acting on the top of the tower produced by a wind along the axis of the dish would be 9425 pounds. If the wind were blowing diagonally across the base, this would produce a tension load of 67,000 pounds in the tension leg, and a compression load of 67,000 pounds in the compression leg, while the two other legs being at the neutral axis of the base would not be affected.

If now we assume that each steel leg has a cross section of 2 square inches, the deflection will be 0.0011 inch per inch of length. For a 200 foot tower this would shorten the compression leg 2.7 inches and increase the length of the tension leg 2.7 inches. This will cause a motion of the dish 21 of approximately 3 feet and throw if off its intended aim one mile for each 65 miles of range. All of the above figures are approximations intended only to show the order of magnitude of the effects for the purpose of illustration.

If, on the other hand, insistors 23 of the proper gradient were inserted between the tower and the footings at the base of the tower, the insistors on the compression and tension legs would have changed in length 2.7 inches under the applied load and this would have cancelled out or compensated for the change in length of the legs. Under these conditions there would not be any motion of the dish 21 and it would have remained properly aimed.

It will also be evident that by adjusting the gradient of the insistor to suit the specific requirements of the structure in which it is used, the insistors can be placed so as to minimize or eliminate unwanted deflection while still permitting deflection which does not disturb the operation. For example, in the structure of FIGURE 1 the insistors could be inserted closer to the top of the tower and used initially for stabilizing the aim of the dish without eliminating the movement of the tower if this were desired. Since any motion involves a time factor, it will be evident that the cancellation of deflection can only be complete instantaneously if the structure does not move at a rate higher than the power capability of the insistor. If the insistor is inadequately powered, it will still bring out cancellation of deflection but it will take a certain time to do this depending on its power capabilities.

Since it is possible to eliminate deflection, those portions of the structure which are free from deflection are also incapable of vibrating under the particular deflecting force. It is thus possible by the insistors to produce an exceedingly high damping effect on the overall structure.

The character of an insistor will be best understood by reference to FIGURE 11. This shows force is arbitrary plus or minus units as the ordinate and deflection in arbitrary plus or minus units as the abscissa. It is thus in effect a stress-strain diagram. For all of the constructional materials commonly known to man, as a force is applied in tension the material elongates, and as a force is applied in compression the material shortens or compresses. Advance lines 25 are drawn to show the usual stress-strain curves for materials having different moduli of elasticity. When the force is positive the deflection is positive as shown by the curves 25. When the force is negative on the other hand, the deflection is negative as shown by the curves 26. The two dotted lines on the opposite sides of each solid line show the effect of higher or lower modulus than that indicated by the solid line.

On the other hand, in an insistor when the force is positive the deflection is negative according to the curves 27 which apply for different rates, by adjustment or design, and likewise when the force is negative the deflection is positive as shown by the curves 28 for different rates. Thus it is seen that for different rates of all materials fall in either the first or the third quadrant and the negative curves of all insistors fall in either the second or the fourth quadrant.

Referring now to FIGURE 10, the upper portion of the figure shows a relaxed column 30 which is connected end to end or mechanically in series with a relaxed insistor 31. The total length is the combined length of the two. Where a force 32 is applied to the combination in the direction shown in the second portion of the view, and no power is applied to the insistor, the total length of the combined column and insistor is shortened as shown. Part of this decrease in length is due to the modulus of elasticity of the material from which the column 30 is made. Also the modulus of elasticity of the parts from which the insistor is made will permit it to shorten somewhat.

Now let us assume that power is applied to the insistor as shown at the bottom portion of FIGURE 10. The force 32 applied to the combination still shortens the column 30 as shown but it causes the insistor to lengthen as illustrated. If the combination is properly designed, the insistor increases in length as much as the column reduces in length, and the total length of the column and insistor is constant regardless of the magnitude of the force 32 which may be applied within the load-carrying capabilities of the structure.

The insistor may function with any suitable power source. It essentially consists of the following basic elements:

(1) A grounded element fastened to one side of the structure in which it is being used, which in effect forms a base.

(2) An actuator element fastened to the other side of the structure in which it is being used and which provides the connection to the device or object whose deflection is being controlled.

(3) A driven element connected between the grounded element and the actuator element to move against a force exerted upon it by the actuator element.

(4) A control element which determines the amount of motion per unit of force which the driven element should have.

The various illustrations of specific devices are intended only to indicate principles and not to indicate that details are essential. For example, harmonic drives have been illustrated in some of the views but this is done for convenience only and any other suitable linear actuator or rotary actuator may be used if desired. The inventive concept is not necessarily related in any way to harmonic drives.

FIGURE 1 shows the microwave tower 20 fastened to concrete pads 22 by insistors 23. If the insistors are properly adjusted to the laws which govern the motion of the tower and the earth pads, a force exerted on the dish 21 on the top will not cause the top to move. As the force is transmitted to the insistors they tend to lengthen at the one side to the same extent that the ower tends to shorten and they tend to shorten at the other side to the same extent that the tower tends to lengthen. In other words, the combined length of the tower leg and the insistor remains constant. Hence a force acting on the top of the tower does not cause the tower to move. The result can be easily checked by simply applying a force and measuring the motion. If the tower moves in the direction of the force, the movement of the insistor should be increased and if it moves in the direction opposite to the force the motion of the insistor should be decreased.

Figure 3:
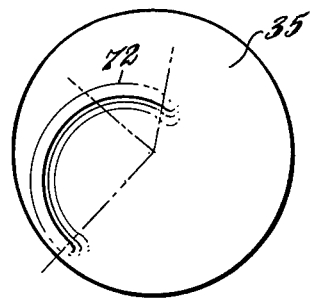
FIGURE 3 is a fragmentary diagrammatic left end elevation of the piston of FIGURE 2, corresponding in position to a section along the line 3—3 of FIGURE 2.

FIGURES 2 and 3 show a compression insistor which employs hydraulic pressure as the power source. The fixed or grounded element comprises a threaded shank 33, a circular extension 34 and a flanged piston 35 which has an annular recess portion 36 which receives an O-sealing ring 37. Surrounding and movable with respect to the circular extension 34 is a housing 38 which has two separable parts 40 and 41 threaded together at 42. The housing 38 comprises the actuator element and there are threaded openings 43 to connect to it. An annular recess 44 in the housing surrounds the circular extension 34 and receives an O-sealing ring 45.

The piston 35 cooperates with a cylinder 46 which constitutes the driven element and lies inside the housing 38 and movable with respect to it. The piston is sealed to the cylinder 46 by the O-ring 37. The cylinder is biased toward the piston by Belleville spring 47 which acts longitudinally between the housing and the base of the cylinder.

The housing has threaded into the end opposite to the piston at 48 a valve casing 50 which is threaded at 51 to connect to a source of hydraulic fluid. The valve casing on the outside extends in slidable relation through an opening $51^1$ in the end of the cylinder remote from the piston and there is an annular groove in the cylinder at 52 which receives an O-sealing ring 53 which seals between the cylinder and the valve casing.

The valve casing has a circular passage 54 extending longitudinally therethrough which is enlarged into an annular chamber 55 at one spaced axial position and into an annular chamber at 56 at another spaced axial position, the annular chamber 56 communicating by ports 57 with the space between the housing 38 and the cylinder 46 at the end remote from the piston.

A valve 58 extends through the circular passage 54 in the valve casing and has a sloping nose 60 and an annular rim 61 which cooperates but is of less axial extent than the annular passage 55. Between the passage 55 and the passage 56 the valve has a portion of reduced diameter 62 which communicates through opening 63 from port 56 with a bore 64 running lengthwise through the interior of the valve.

The valve at the end within the cylinder 46 has lug extensions 65 which hold a pivot pin 66 on which pivots a toggle lever 67 which extends out in both directions beyond the pivot.

The toggle lever 67 at one end 68 engages under a lip 70 which extends out from the end wall of the cylinder toward the piston. At the opposite end 71 the toggle lever 67 engages on an abutment 72 which extends out from the piston toward the opposite wall of the cylinder and is preferably of variant distance from the center as best seen in FIGURE 3, so that relative rotation of the piston by separating the housing at the threads 42 will determine the effective lever arm at the abutment 72 where the toggle lever engages at 71. The interior of the housing part 40 is splined at 73 and the outside of the piston 35 is splined at 74, so that the piston will remain in a particular rotational setting and will not turn and lose the adjustment. The spline 73 does not interfere with the cylinder 46.

The toggle lever 67 is prevented from turning and thus turning the valve to lose the adjustment by lugs 75 from the end wall of the cylinder which lie on either side of the toggle lever. (Only one of such lugs is shown.)

In operation, with the piston 35 fixed and a source of hydraulic fluid pressure connected to the threaded connection 51, if a force is applied to the end of the housing 38 remote from the piston 35 tending to move the housing 38 to the right against the Belleville spring 47, the slide valve 58 will uncover the annular passage 55 in the valve at the side toward the cylinder 46 and allow hydraulic fluid to flow through the annular space 62 and the annular passage 56 and the port 63 into the opening 64 in the center of the valve and into the chamber 76 inside the space provided by the cylinder 46 and the piston 35. This will cause the cylinder 46 to move to the left and apply force to the Belleville spring 47 and through the Belleville spring to the housing 38 to move the housing to the left to its originating position. However, this causes the slide valve to move and as a result the motion produced is somewhat greater than the original motion of the force against the case. The case combats and tends to move back the object applying this force, the distance depending on the compression of the Belleville spring.

An important point will be noted here. The relative movement of the slide valve to the moving piston determines the insistor gradient. If the slide valve were fastened to the fixed piston, the position of the outside housing would be essentially fixed regardless of the force. The driven cylinder would load up the Belleville spring as a function of the force but it would not allow the housing to move. If it moved "in" the Belleville spring would be loaded up until it returned to its precise starting point. If it moved "out" the slide valve 58 would drain the expansible chamber 76 and unload the spring and return it to its starting position. Hence with the slide valve fastened to the fixed member, the unit would have neither a negative nor a positive gradient. It would be essentially rigid and essentially position sensitive.

If the slide valve 58 were fastened to the driven element 46 the unit would be strictly force-sensitive and position would have no influence on it. Hence at a given force the unit would expand to the full limit of the piston travel. It would not return until the force was reduced to below a certain level.

By actuating the slide valve by the toggle lever connected between the fixed element 33 and the driven element 46, the insistor is made responsive to both force and position. Since both of these modify the valve position each exerts its influence. To adjust the valve effect it is only necessary to adjust the relative lengths of the lever arms. In the insistor of FIGURES 2 and 3 the ridge 72 has different radial positions at different circumferential positions. Hence the radial position of the piston in relation to the cylinder determines the length of the lever arm. Selecting the appropriate relationship determines the gradient and thus the gradient is adjustable.

Figure 4:
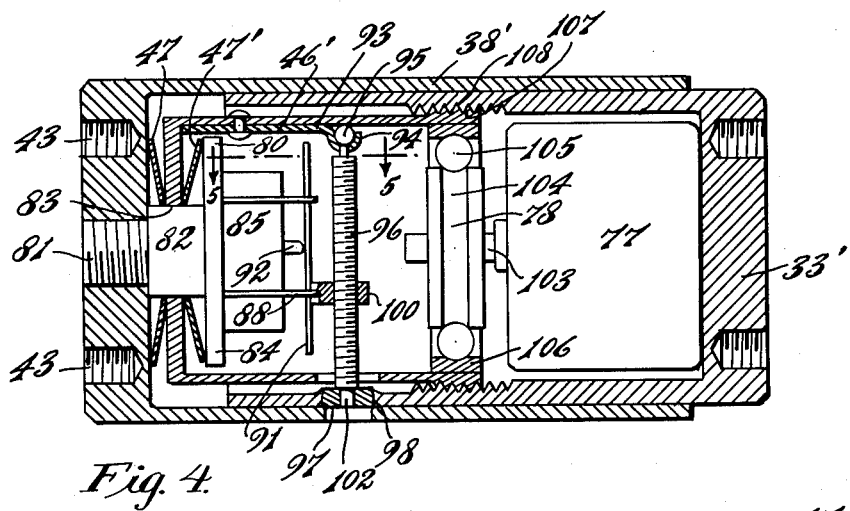
FIGURE 4 is a diagrammatic axial section of an electrical form device according to the invention using a harmonic drive.
Figure 5:
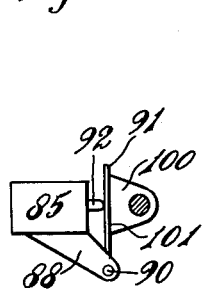
FIGURE 5 is a fragmentary diagrammatic section on the line 5—5 of FIGURE 4.

In FIGURE 4 the same results are obtained using a harmonic drive linear actuator as shown in my U.S. Patent No. 2,943,508, granted July 5, 1960, for Strain Wave Gearing—Linear Motion. The fixed element $33^1$ is at the right, and it telescopes with respect to the actuator element $38^1$ which is adapted to be connected to the object by which the force is applied.

An electric motor 77 mounted on the inside of the fixed element $33^1$ provides the power, and drives a harmonic drive linear actuator 78 which moves a driven element $46^1$ which has opposed Belleville springs 47 and $47^1$ interposed between it and the actuator $38^1$ and acting axially. An extension 80 on the actuator $38^1$ is threaded into the actuator at 81 and has a suitably circular Belleville spring guide 82 which lies within the Belleville springs and also slidably guides driven element $46^1$ at 83 where it passes through an opening in the end wall of the driven element. The extension 80 has a flange 84 which operates against the Belleville spring $47^1$ and also has a switch housing 85 which interconnects with the control element as later explained.

Figure 6:
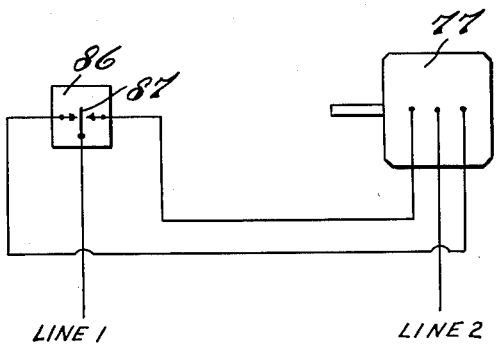
FIGURE 6 is an electrical circuit diagram for the device of FIGURES 4 and 5.

The switch housing 85 contains a single-pole double-throw center-off spring-loaded out electric switch 86 which is illustrated in FIGURE 6 in circuit with the reversible motor 77 so that depending on which way the movable element 87 is thrown, the motor 77 will be driven in one direction or the other and if the movable switch element 87 is in neutral position the motor will not be energized. Mounted on the switch housing 85 by brackets 88 is a pivot shaft 90 which pivots a switch actuator plate 91 which is biased out by the spring on the switch operating element 92.

The driven element $46^1$ has a pivot bracket 93 which pivotally connects at 94 with ball end 95 of lever 96, the other end has a spherical end portion 97 which journals in spherical bearing 98 on fixed element $33^1$.

The lever 96 performs the functions of lever 67 previously described. For convenience in adjustment, the lever 96 is made in the form of a screw which threads nut 100 which is flat on one side at 101 and engages against plate 91 in a manner to actuate the switch 86. The screw is rotatable with spherical bearing portion 97 by turning screw driver opening 102 so that the screw can be made to adjust the nut and thus adjust the effective relation of the lever arms of the control lever.

The motor 77 accomplishes adjustment of the adjusting device 78 by mounting on the motor shaft 103 a strain inducer or wave generator which has an elliptoidal race 104 suitably with two lobes, which carry balls 105 which cooperate with the inside of deflectable race 106 which is deflected into elliptoidal form and with it deflects into interengagement threads 107 on driven element $46^1$ which at the lobes engage interior threads 108 on the fixed element $33^1$. The threads have a difference in lead which equals the number of lobes on the wave generator.

In between the lobes where engagement takes place, the teeth 107 and 108 are out of contact and out of mesh, as explained in my U.S. Patent No. 2,943,508, above referred to.

In operation of this device as previously described, force applied to the actuator $38^1$ from the left compresses Belleville spring 47 and actuates switch 86. The motor runs in a direction to move the driven element $46^1$ against the Belleville spring 47. When the position determined by the proper pressure is reached, the control mechanism including the lever 96 opens the switch 86 and thus stops operation of the motor.

Figure 7:
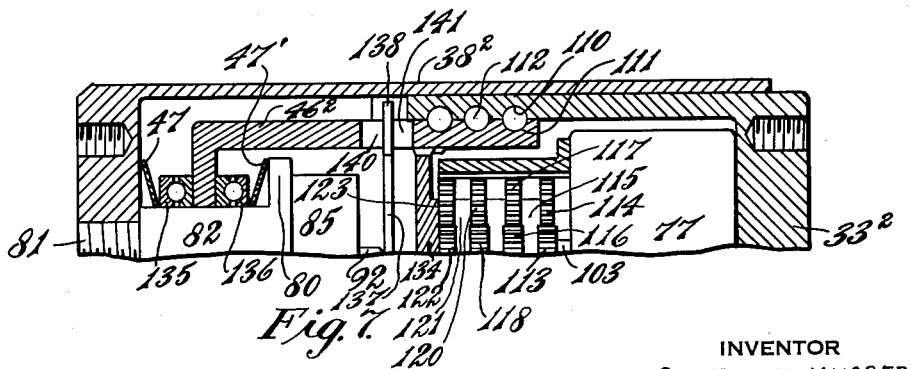
FIGURE 7 is a fragmentary diagrammatic axial section of a modification of the device of FIGURES 4 to 6 which involves a planetary drive and a modified form of control element.

FIGURE 7 is similar to the form of FIGURE 6 with the fixed element $33^2$ over to the right and the actuator element $38^2$ at the left and in telescoping relation to one another. Instead of the harmonic drive as in the form of FIGURE 4, the fixed element has an internal screw 110 which cooperates with an external screw 111 on driven element $46^2$, there being balls 112 between the fixed element $33^2$ and the driven element $46^2$ to form a ball bearing screw. A stacked planetary drive acts as the speed reducer from the motor. Thus the motor shaft 103 drives a sun gear 113, which by planetary action rotates planetary gears 114 (only one of which is shown), which are rotatable on planet carrier 115 which is rotatable and rigidly connected with sun 116. Sun 116 meshes with rotatable planets 117 which are rotatably mounted on rotatable planet carrier 117 which is rigidly connected with sun 118. Sun 118 meshes with rotatable planets 120 which are mounted on rotatable planet carrier 121 which rigidly mounts sun 122. Sun 122 meshes with planets 123 which are rotatable and mounted on plate 134, which in turn is in driving connection with driven element $46^2$. Antifriction bearings 135 and 136 are interposed between Belleville springs 47 and 47′ and the end wall of the driven element $46^2$ so that the driven element $46^2$ can rotate freely on circular guide 82 of the actuator.

Instead of operating the control element 92 of the switch in the housing 85 by a lever, it is actuated by a plate 137 which has three lugs 138 (only one of which is shown) which enter slots 140 extending radially through the driven element $46^2$ and rotate with respect to cam faces 141 in the fixed element $33^2$ which extend circumferentially and also rise or descend axially. The control element 92 is rotated by the driven element. The cam face 141 has a helix angle less than the helix angle of the ball bearing screw in which the balls 112 turn.

Figures 8, 8A:
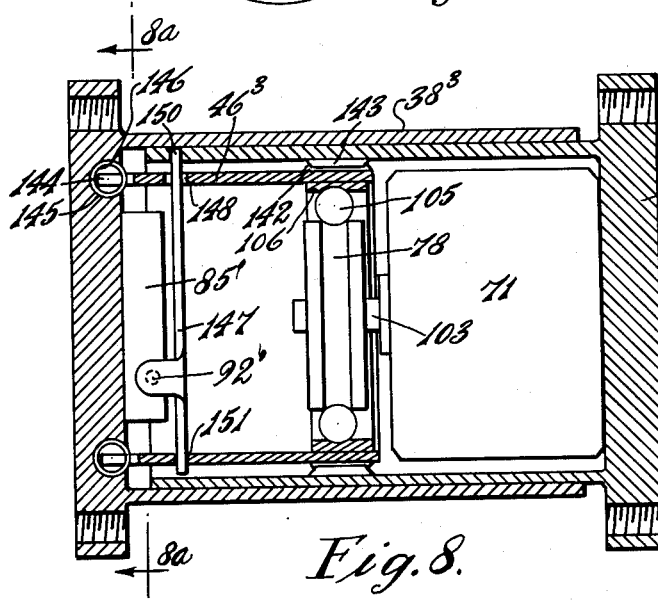
FIGURE 8 is a diagrammatic axial section of a further modification of the device of the invention which responds torsionally.
FIGURE 8a is a fragmentary section on the line 8a—8a of FIGURE 8.

In some cases it is desirable to provide a torsional insistor as shown in FIGURE 8. Here the fixed element $33^3$ telescopes with respect to the actuator $38^3$, the fixed element and the actuator being provided to torsionally engage the fixed element with which they are connected. A rotational harmonic drive is connected to the motor 71, the race 106 on the outside of the wave generator deflecting spline teeth 142 on the outside of the driven element $46^3$ so that at the lobes they are in contact with teeth 143 on the inside of the rigid circular fixed element $33^3$. The teeth 143 are circular but the teeth 142 are out of contact and out of mesh with the teeth 143 except at the lobes of the wave generator. See my U.S. Patent No. 2,906,143, granted September 29, 1959, for Strain Wave Gearing.

The driven element $46^3$ has projections 144 into an annular groove 145 in the end of the actuator $38^3$ and these projections are compressed between the ends of helical compression springs 146 which are anchored in arcuate grooves 145 so that there is resilient spring bias between the position of the driven element 46³ and the position of the actuator. The switch housing 85¹ holds the switch disposed sideways so that its actuator 92¹ is in the direction at right angles to the plane of the paper, and lever 147 passes through a radial groove 148 in the driven element 46³ so that it will not contact the driven element at that point and is torsionally pivotally mounted in the fixed element at 150 and in the driven element at 151 at opposite sides.

In operation when force is applied torsionally to the actuator 146 it causes the switch to actuate, and this results in energizing the motor and driving the driven element against the compression of the appropriate springs 146.

In view of my invention and disclosure, variations and modifications to meet individual whim or particular need will doubtless become evident to others skilled in the art, to obtain all or part of the benefits of my invention without copying the structure shown, and I, therefore, claim all such insofar as they fall within the reasonable spirit and scope of my claims.

Having thus described my invention what I claim as new and desire to secure by Letters Patent is:

1. A device for use in correction for change in position of structure, said device comprising a first element adapted to be grounded by fastening to a grounded first structural member, an actuator element adapted to be connected to move in response to force with a movable second structural member opposite said first element, a driven element operatively interconnected between said first element and said actuator element and adapted to be driven and move said actuator element against force exerted by said actuator element, and a control element for said driven element responsive to force and position of said actuator element and inducing counter to force of said actuator element a corrective motion of said driven element varying as a direct function of force and position of said actuator element whereby, upon said first element being fastened to a grounded first structural member and upon said actuator element being connected with a movable second structural member under load which alters positions in space of both first and second points on the movable second structural member and simultaneously induces strain in the movable second structural member with concurrent change in position of the first point with reference to the second point, corrective motion of said driven element counter to the load is induced by said control element for said driven element to move said actuator element counter to the load a distance substantially restoring the position in space of the first point.

2. A device of claim 1, in which the corrective motion of said driven element is substantially equal to the amount of motion of said actuator element produced by force on said actuator element plus the change in distance between the two points arising from strain.

3. A device of claim 1, in which said control element comprises means to sense the motion of said actuator element.

4. A device of claim 1, in which said control element is responsive both to the position of said driven element and of said first element, both with respect to said actuator element.

5. A device of claim 1, in combination with means to adjust said control element for varying the ratio of the response of said control element to force of said actuator element and the response of said control element to position of said actuator element.

6. A device of claim 1, in combination with resilient means urging said actuator element and said driven element away from one another and permitting relative motion between the two, said resilient means capable of resisting a predetermined force in excess of the force applied to said actuator element.

7. A device of claim 1, in which said driven element is hydraulically operated, and in which said control element comprises control valve means.

8. A device of claim 1, in which said control element comprises valve means responsive to the relative positions of said first element, said driven element and said actuator element, in combination with hydraulic means acting between said first element and said driven element, and resilient means interposed between said driven element and said actuator element.

9. A device of claim 1, in combination with a motor reversibly drivably connected with said driven element, and said control element comprises means responsive to the relative positions of said actuator element, said driven element and said first element to one another for controlling the movement of said driven element by operation of said motor.

10. A device of claim 9, in which said motor and driven element are interconnected by harmonic drive means.

11. A device of claim 9, in which said motor and driven element are interconnected by planetary drive means.

12. A device of claim 1, in which said first element, actuator element and driven element are interrelated to operate in a straight line axial relation.

13. A device of claim 1, in which said first element, actuator element and driven element are interrelated to operate in axially turning relation.

14. A device of claim 1, in which said control element comprises means responsive to a particular setting of said first element with respect to said control element.

References Cited by the Examiner

UNITED STATES PATENTS

| | | | |
|---|---|---|---|
| 2,650,107 | 8/53 | Monnig | 60—97 X |
| 2,707,119 | 4/55 | Bobrick. | |
| 2,956,761 | 10/60 | Weber | 248—23 X |
| 2,964,333 | 12/60 | Trevaskis | 60—97 |
| 2,965,343 | 12/60 | Sherburne et al. | 248—58 |
| 2,965,372 | 12/60 | Cavanaugh | 267—1 |
| 2,993,670 | 7/61 | Zollinger | 248—58 |

RICHARD W. COOKE, JR., *Primary Examiner.*

JOEL REZNEK, JACOB L. NACKENOFF, *Examiners.*